United States Patent [19]
Beppu et al.

[11] Patent Number: 6,053,004
[45] Date of Patent: Apr. 25, 2000

[54] OUTDOOR UNIT OF SEPARATE TYPE AIR CONDITIONER

[75] Inventors: Naoko Beppu, Moriyama; Koji Hatano, Otsu; Mitsuo Nakanuma, Gamou-gun, all of Japan

[73] Assignee: Matsushita Electric Industrial Co., Ltd., Osaka, Japan

[21] Appl. No.: 09/180,153

[22] PCT Filed: Feb. 20, 1998

[86] PCT No.: PCT/JP98/00725

§ 371 Date: Dec. 8, 1998

§ 102(e) Date: Dec. 8, 1998

[87] PCT Pub. No.: WO98/39603

PCT Pub. Date: Sep. 11, 1998

[30] Foreign Application Priority Data

Mar. 3, 1997 [JP] Japan .................................. 9-047888

[51] Int. Cl.[7] ............................................. F25D 21/14
[52] U.S. Cl. .............................. 62/285; 62/280; 62/262
[58] Field of Search ............................. 62/262, 298, 280, 62/285

[56] References Cited

U.S. PATENT DOCUMENTS

| | | | |
|---|---|---|---|
| 4,538,425 | 9/1985 | Ohishi et al. | 62/280 |
| 5,085,057 | 2/1992 | Thompson et al. | 62/262 |
| 5,372,189 | 12/1994 | Tsunekawa et al. | 62/262 |

FOREIGN PATENT DOCUMENTS

| | | | |
|---|---|---|---|
| 0060133 | 4/1984 | Japan | 62/280 |
| 0060135 | 4/1984 | Japan | 62/280 |
| 0202341 | 11/1984 | Japan | 62/280 |

*Primary Examiner*—Henry Bennett
*Assistant Examiner*—Melvin Jones
*Attorney, Agent, or Firm*—Ratner & Prestia

[57] ABSTRACT

A unit of a separate type air conditioner capable of easily preventing water seeping into the power source board installation region is presented. In the rotating direction, a drip board between a fan and a power source installation boar is provided.

18 Claims, 5 Drawing Sheets

FIG. 5

OUTDOOR UNIT OF SEPARATE TYPE AIR CONDITIONER

This application is a U.S. national phase application of PCT international application PCT/JP98/00725.

TECHNICAL FIELD

The present invention relates to an outdoor unit of a separate type air conditioner to be installed outdoors, and more particularly to an outdoor unit appropriate to be wired and assembled from above its housing.

BACKGROUND ART

Recently, an outdoor unit of a separate type air conditioner, particularly, an outdoor unit to be installed on the wall immediately beneath a window, verandah, stairs or rooftop is reduced in size and weight. In addition, wiring and piping sections are provided in the upper part of the housing and the top of the housing is a detachable top plate, in most cases, for the convenience of wiring or assembling from above the unit.

Figure 5:
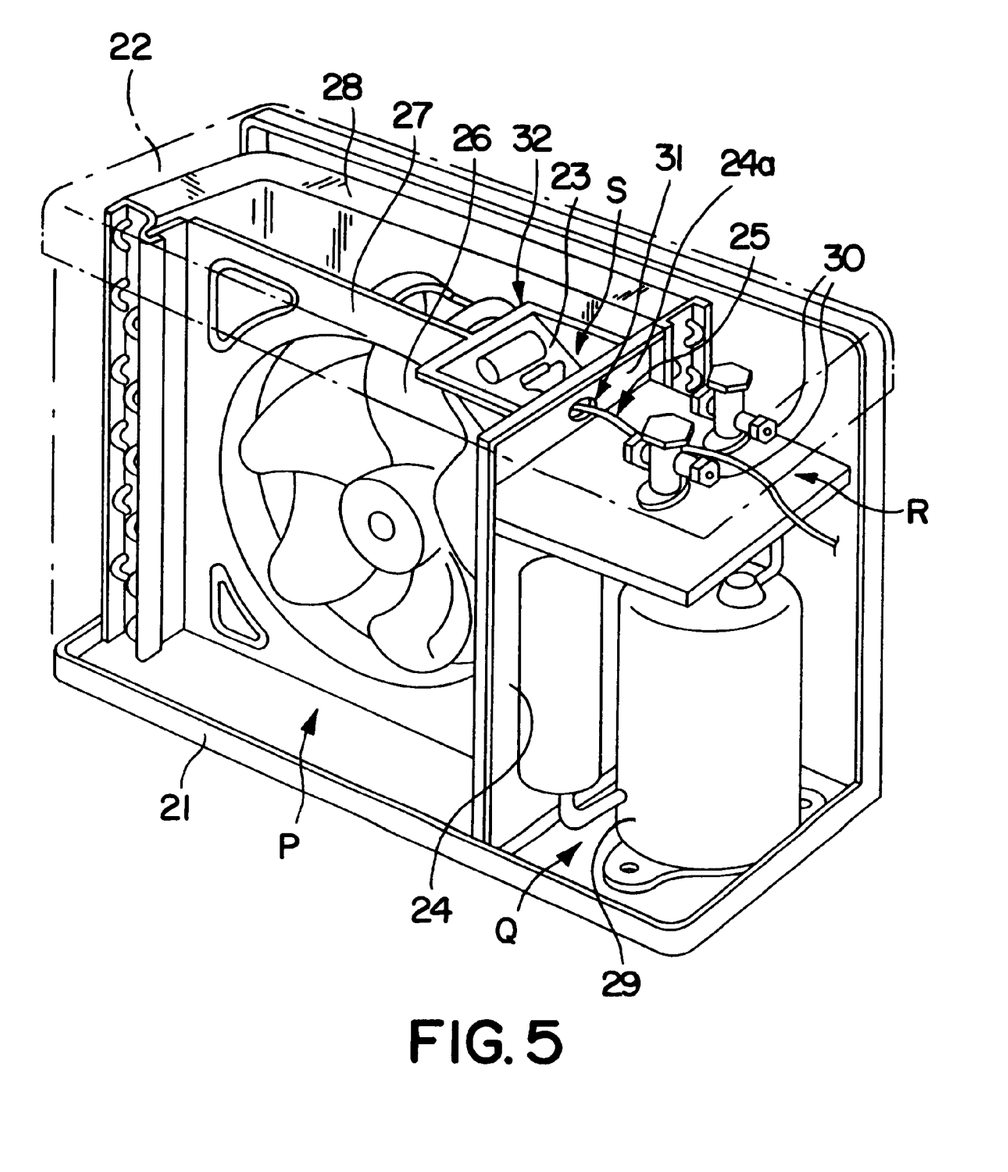
FIG. 5 is a perspective view showing a prior art.

A conventional example of such outdoor unit is shown in FIG. 5, in which the inside of a housing 21 is partitioned into a fan compartment P and a compressor compartment Q by means of a soundproof board 31. The fan compartment P accommodates a fan 26, a heat exchanger 28, and other components. The compressor compartment Q accommodates a compressor 29 and other components in its lower part, and incorporates a wiring junction 30 for connecting a refrigerant piping from the indoor unit to the compressor 29 in its upper part. A wiring 25 for a power source connection is drawn in from the outside of the housing 21 into an installation space R so that wiring work can be done from above the unit by making use of the installation space R of the wiring junction 30 provided in the upper part of the compressor compartment Q. However, since dew may condense on the wiring junction 30 due to the operation of the air conditioner, a power source board 23 is provided in an installation space S above the side of the fan compartment P and separated from the installation space R by a partition wall 24a. The wiring 25 is connected through a penetration hole 31 provided in the partition wall 24a. Such wiring work from above the unit is done by opening the upper part of installation spaces R, S by detaching top plate 22 of housing 21. After the wiring work is done, and to prevent water from seeping into the installation space S of the power source board 23, and to prevent rainwater or water made by defrosting operation in the heating mode from seeping through the gap of the penetration hole 31 and wiring 25 or into the fan compartment P to deposit on the fan 26, part of the water is scattered forcibly toward the installation region of the power source board 23 by the rotation of the fan 26. Accordingly, gaps formed in the air passage between a gorge 32 opened upward in the installation space S of the power source board 23 and the top plate 22, or in the installation space S are filled and sealed with caulking material or the like.

In a conventional outdoor unit, however, the wiring 25 drawn into the installation space R from outside of the housing 21 must be further drawn into the installation space S through the penetration hole 31, and hence the wire drawing work is not easy. Further, the work of connecting the wiring 25 drawn into the installation space S to the power source board 23 is not easily accomplished because of the obstacle of the partition wall 24a between the both installation spaces R, S.

Moreover, gaps formed between the air passage and the installation space S vary with the shape and structure of the installation space S. The shape is complicated between the gorge 32 opened above and top plate 32, and its surface area is relatively wide; the same caulking as above is difficult, and it takes a long time, plenty of sealing material is required, raising job cost.

The invention is devised in the light of the above problems, and it is hence a primary object thereof to present an outdoor unit of separate type air conditioner capable of easily preventing water seeping into the power source board installation region, and also to enhance, as required, the working efficiency of wiring and assembling from above the unit.

DISCLOSURE OF THE INVENTION

To achieve the object, the invention presents an outdoor unit of separate type air conditioner comprising a fan provided in a housing, installed outdoors, and a power source board positioned in the upper part near the fan, in which a drip board is provided across a tangent from the fan toward the power source board installation region in the rotating direction.

According to the outdoor unit of the separate type air conditioner of the invention, if the water seeping into the outdoor unit and depositing on the fan is scattered toward the power source board installation region by the rotation of the fan, all of water scattering toward the power source board installation region is on the tangent from the fan toward the power source installation region in the rotating direction crossed by the drip board provided in the above position condition, and is shut off before reaching the power source board installation region. Therefore, without sealing the air passage between the power source board installation region and the fan after wiring connection, seeping of water into the power source board can be prevented.

When the drip board is formed integrally with the top plate so as to drop from this top plate, the drip board can be installed without increasing the number of parts and the number of assembling steps, and no gap is formed between the drip board and the top plate. Hence, caulking for filling up the gap is not necessary.

The constitution comprises a top plate detachably provided in the upper part of the housing, a communication port opened upward for passing wiring from inside of the housing adjacent region to the power source board installation region, and a partition board formed integrally with the top plate so as to drop from the top plate corresponding to the communication port and cut off by seeping into the communication port from above, in which the partition board has a flexible resin member or rubber member contacting by along the shape of the opposite surface provided at its lower end. In this constitution, when drawing in the wiring into the housing from outside, and connecting it to the power source board installation region from its adjacent region, it is enough by laying over both the power source board installation region and the adjacent region and fitting together from above into the communication port opened upward, and the step of passing through a hole is not necessary and hence the wiring work efficiency is enhanced. Moreover, after wiring, only by mounting the top plate, the flexible resin member or rubber member provided at the lower end of the partition board formed integrally with the top plate is deformed to contact tightly with the opposite surface across the wiring; therefore seepage of water from the adjacent region through the communication port is prevented without doing any particular sealing job, which is very convenient. Still more, when the communication port is set in the full width of the power source board installation region, the partition wall between the two regions is eliminated in the wiring work, and it is more preferable for connecting the wiring to the power source board.

BEST MODE FOR CARRYING OUT THE INVENTION

Referring now to the drawings, preferred embodiments of the invention are described in detail below.

Figure 1:
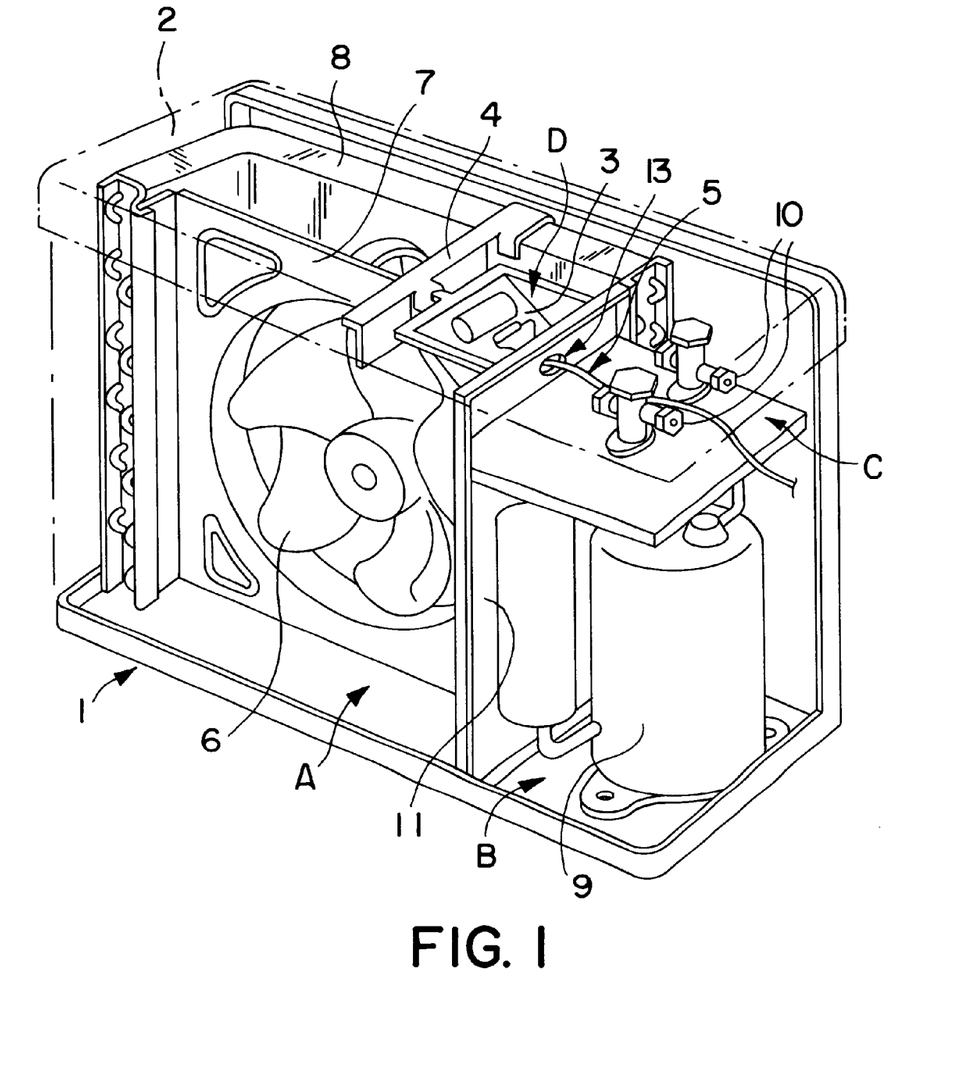
FIG. 1 is a perspective view showing a first embodiment of an outdoor unit of a separate type air conditioner of the invention.
Figure 2:
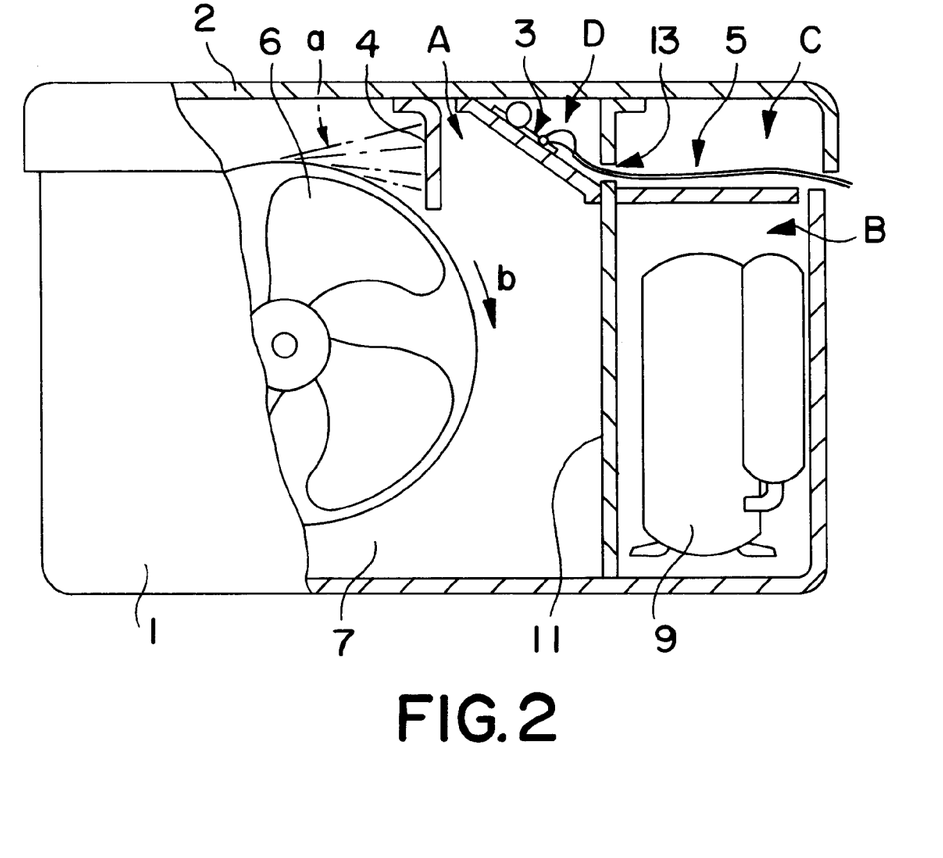
FIG. 2 is a schematic sectional top view of FIG. 1.

A first embodiment of an outdoor unit of a separate type air conditioner of the invention is a box-shaped outdoor unit mounted on an outer wall, for example, beneath a window as shown in FIG. 1 and FIG. 2. The inside of a housing 1 of such outdoor unit is partitioned into a fan compartment A accommodating a fan 6, a heat exchanger 8, and other components, and a compressor compartment B accommodating a compressor 9 and other components, as being separated by a soundproof board 11, and a detachable top plate 2 is provided on the upper surface of the housing 1. A power source board installation region D in the upper part of the fan compartment A incorporates a power source board 3 as a junction of a wiring 5, a drip board 4 crossing the tangent a from the fan 6 toward the power source board installation region D in the rotating direction b of fan 6; A piping connection region C in the upper part of the compressor compartment B includes a piping junction 10; further in the upper part of the soundproof board 11, there is a penetration hole 13 for passing the wiring 5 to the power source board installation region D from the piping connection region C in its adjacent region.

The drip board 4 is a plate member as shown in FIG. 1 and FIG. 2; its lower side drops toward the lower part of the fan compartment A, and its upper end is constituted so as to rang abut nearly against the top plate 2 in the state of the top plate 2 being mounted on the housing 1. This drip board 4 may be easily installed by making use of the space above the heat exchanger 8 or fan guard 7, or detached for maintenance, and it can be additionally installed depending on the conventional outdoor unit.

After mounting the outdoor unit on the outer wall beneath a window, top plate 2 is detached, and wiring 5 from the indoor unit (not shown) is drawn into the wiring connection region C. Further this wiring 5 is connected to the power source board 3 through penetration hole 13 in the upper part of the soundproof board 11. The pipe is connected to the piping junction 10, and top plate 2 is put back finishing the installation work is over.

During use of this outdoor unit rainfall or water made by defrosting operation in the heating mode may seep into the outdoor unit to condense dew. When this water deposits on the fan 6 and is scattered by rotation of the fan 6, and although this water is slightly affected by gravity or the like, the water is scattered forcibly in the tangential direction nearly by the rotating direction b. According to the first embodiment, as shown in FIG. 2, if part of this water is scattered along the tangent a toward the power source board installation region D by the rotating direction b of fan 6, the water is shut off by the drip board 4 before reaching the power source board installation region D. Accordingly, seepage of water into the power source board 3 is prevented without sealing in between the air passage forming the fan compartment A and the power source board installation region D after connection of the wiring 5.

Figure 3:
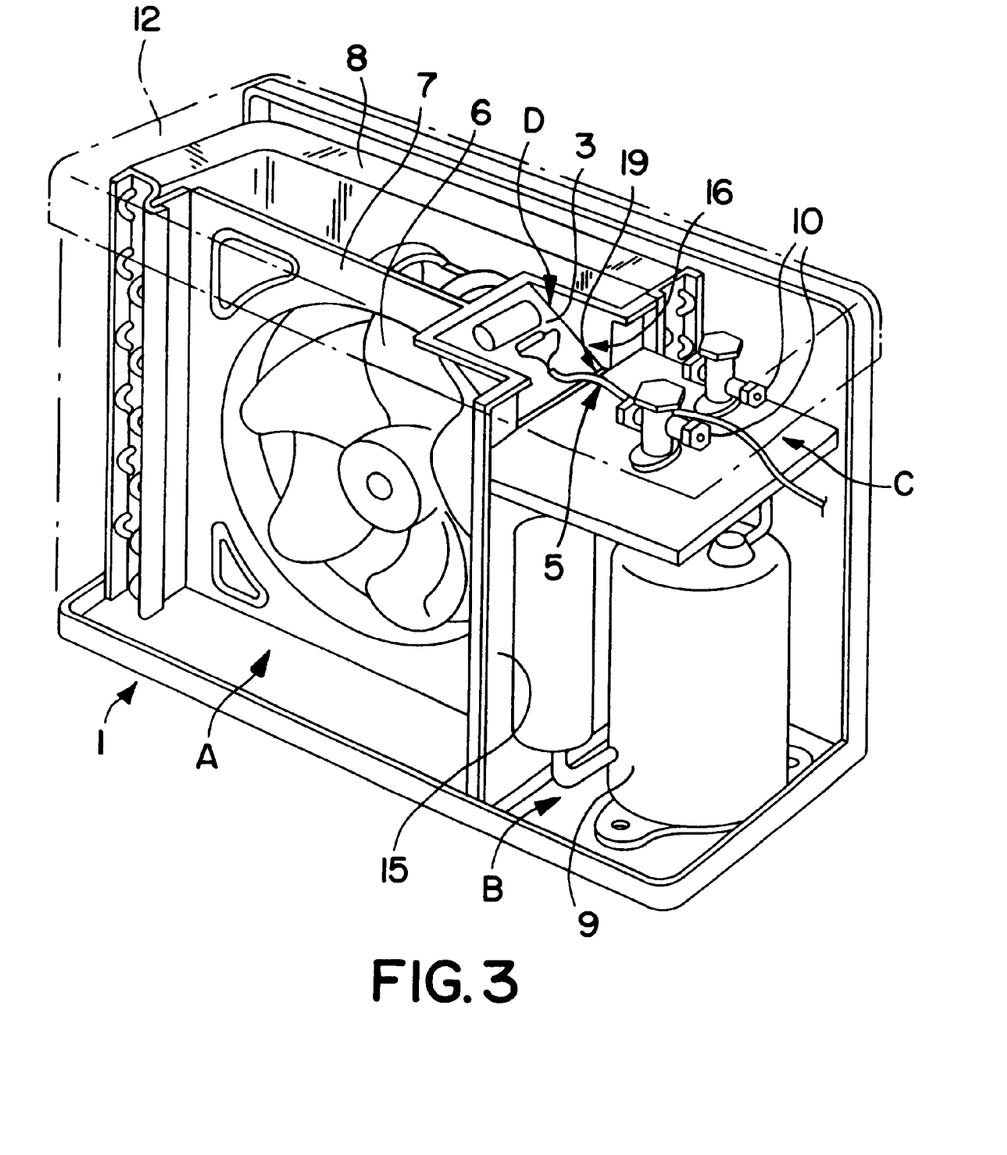
FIG. 3 is a perspective view showing a second embodiment of an outdoor unit of a separate type air conditioner of the invention.
Figure 4:
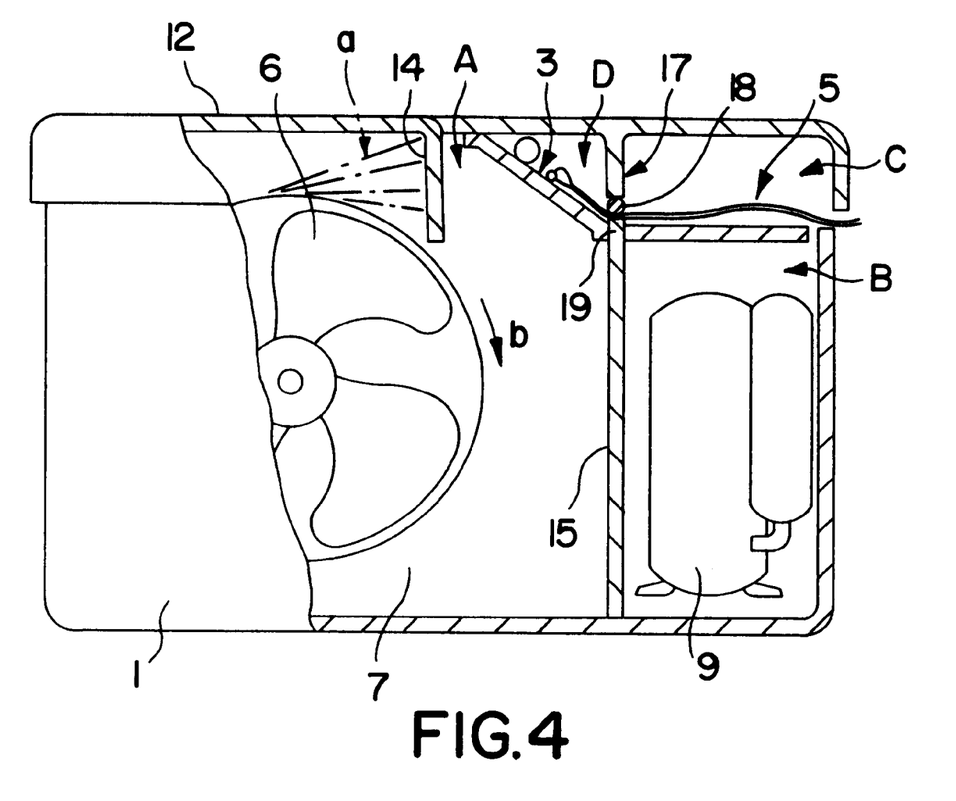
FIG. 4 is a schematic sectional top view of FIG. 3.

A second embodiment of an outdoor unit of a separate type air conditioner of the invention is shown in FIG. 3 and FIG. 4. FIGS. 3, 4 show the lower part of the inside of a housing 1 partitioned nearly into two compartments by a soundproof board 15, that is, a fan compartment A accommodating a fan 6 and other components, and a compressor compartment B accommodating a compressor 9 and other components. The upper part inside the housing 1 includes a power source board 3 above fan 6, a piping junction 10 above the compressor 9, a communication port 16 opened upward for passing the wiring 5 from a piping connection region C to a power source board installation region D, and a detachable top plate 12 provided on the housing 1.

The top plate 12 is integrally provided with, as shown in FIG. 4, a drip board 14 droping from top plate 12 and crossing the tangent from the fan 6 toward the power source board installation region D, and a partition board 17 droping from top plate 12 corresponding to the communication port 16 with its resin member 18 provided at the lower end thereof. Resin member 18 deforms to contact tightly with its shape corresponding to the opposite surface 19 of the communication port 16.

The drip board 14 has its upper end welded to the top plate 12 without gap, and its lower side is composed to drop toward the lower part of the fan compartment A with the top plate 12 mounted on the housing 1.

The partition board 17 has its upper end welded to the top plate 12 without gap. At its lower end, a flexible silicone resin member 18 containing a plasticizer is provided. After wiring to the power source board 3, by mounting top plate 12 on housing 1, the silicone resin member 18 is deformed to contact tightly with the opposite surface 19 of the communication port 16. The wiring 5 crossing the communication port 16 is pinched against the opposite surface 19, thereby partitioning between the power source board installation region D and piping connection region C to seal the communication port 16.

The member provided at the lower end of this partition board 17 is not limited to the above, and any other material may be used as far as it has enough flexibility for deformation, adhesion to the opposite surface 19 and necessary adhesion strength to the lower end of the partition board 17, and rubber member, for example, such as synthetic rubber scarcely containing hardener may be also used.

According to the second embodiment, as shown in FIG. 4, the same action as in the first embodiment is obtained without increasing the number of parts. Or, when wiring from outside to the power source board 3 through the piping connection region C, as shown in FIG. 3, since there is no partition board 17 in the communication port 16 for laying down the wiring 5, the wiring work may be done easily. Moreover, after wiring, only by mounting top plate 12 on housing 1, as shown in FIG. 4, communication port 16 can be sealed with the partition board 17. Accordingly, without any particular sealing job between the power source board installation region D and piping connection region C, invasion of water from the piping connection region C through the communication port 16 can be prevented.

As in the embodiment, when communication port 16 is set in the full width of the power source board installation region D, the partition wall between the power source board installation region D and the piping connection region C is eliminated in the wiring work, and it is more preferable for connecting the wiring 5 to the power source board 3. The invention, however, is not limited to this, and the width of the communication port is enough as far as the wiring 5 can be fitted in from above, and it is not necessary to pass the wiring 5 through the penetration hole, and the working efficiency is enhanced.

Industrial Applicability

According to the outdoor unit of the separate type air conditioner of the invention, if the water seeping into the outdoor unit and depositing on the fan is scattered toward the power source board installation region by the rotation of the fan, all of water scattering toward the power source board installation region is on the tangent from the fan toward the power source installation region in the rotating direction crossed by the drip board provided in the above position condition, and is shut off before reaching the power source board installation region. Therefore, without sealing the air passage between the power source board installation region and the fan after wiring connection, seepage of water into the power source board can be prevented.

When the drip board is formed integrally with the top plate so as to drop from this top plate, the drip board can be installed without increasing the number of parts and the number of assembling steps, and no gap is formed between the drip board and the top plate. Hence, caulking for filling up the gap is not necessary.

The constitution comprises a top plate detachably provided in the upper part of the housing, a communication port opened upward for passing wiring from the housing internal adjacent region to the power source board installation region, and a partition board formed integrally with the top plate so as to droop from the top plate corresponding to the communication port and cut off by invading into the communication port from above, in which the partition board has a flexible resin member or rubber member contacting by deforming along the shape of the opposite surface provided at its lower end. In this constitution, when drawing in the wiring into the housing from outside, and connecting it to the power source board installation region from its adjacent region, it is enough by laying over both the power source board installation region and the adjacent region and fitting together from above into the communication port opened upward, and the step of passing through a hole is not necessary and hence the wiring work efficiency is enhanced. Moreover, after wiring, only by mounting the top plate, the flexible resin member or rubber member provided at the lower end of the partition board formed integrally with the top plate is deformed to contact tightly with the opposite surface across the wiring, and therefore invasion of water from the adjacent region through the communication port is prevented without doing any particular sealing job, which is very convenient. Still more, when the communication port is set in the full width of the power source board installation region, the partition wall between the two regions is eliminated in the wiring work, and it is more preferable for connecting the wiring to the power source board.

We claim:

1. A unit of separate type air conditioner comprising;
a fan provided in a housing, and
a power source board positioned in an upper part near said fan,
wherein a drip board is provided between said fan and said power source board.

2. A unit of separate type air conditioner of claim 1, wherein said drip board is formed integrally with a top plate so as to droop from said top plate.

3. A unit of separate type air conditioner of claim 2, further comprising:
a detachable top plate mounted on said housing,
a communication port for passing a wiring from the housing into the power source board, and
a partition board formed integrally with the top plate and, dropping from said top plate corresponding to the communication port to cut off by invading into said communication port from above,
wherein said partition board has a flexible resin member for contacting tightly with an opposite surface along its shape.

4. A unit of separate type air conditioner of claim 1, further comprising;
a detachable top plate mounted on said housing,
a communication port for passing a wiring from the housing into the power source board, and
a partition board formed integrally with the top plate and, dropping from said top plate corresponding to the communication port to cut off by invading into said communication port from above,
wherein said partition board has a flexible resin member for contacting tightly with an opposite surface along its shape.

5. A unit of separate type air conditioner, comprising:
(a) a housing having a top plate,
(b) a fan positioned inside of said housing,
(c) a power source board positioned inside of said housing, and near said fan, and
(d) a drip board positioned between said fan and said power source board.

6. A unit of claim 5,
wherein said drip board stops water scattered by rotation of said fan, and prevents said water from being deposited on said power source board.

7. A unit of claim 5,
wherein said power source board is positioned at a distance above and near said fan.

8. A unit of claim 5,
wherein a surface of said power source board is positioned oblique.

9. A unit of claim 5,
wherein said drip board is positioned integrally with said top plate.

10. A unit of claim 5,
wherein said top plate is detachable from said housing,
said drip board is positioned integrally with and drops from said top plate,
said top plate is positioned between said fan and said power source board.

11. A unit of claim 5, further comprising:
(e) an adjacent region having a wiring, positioned inside said housing, and (f) a partition board positioned between said adjacent region and said power source board installation region.

12. A unit of claim 5, further comprising:
(e) an adjacent region having a wiring, positioned inside said housing, and
(f) a partition board positioned between said adjacent region and said power source board installation region,
wherein said partition board is positioned integrally with said top plate.

13. A unit of claim 5, further comprising:
(e) an adjacent region having a wiring, positioned inside said housing, and
(f) a partition board positioned between said adjacent region and said power source board installation region,
wherein said drip board and said partition board are positioned integrally with said top plate.

14. A unit of claim 5, further comprising:
(e) an adjacent region having a wiring, positioned inside said housing,
(f) a communication port formed between said adjacent region and said power source board installation region, said wiring being installed through said communication port, and
(g) a partition board positioned in said communication port, between said adjacent region and said power source board installation region.

15. A unit of claim 5, further comprising:
(e) an adjacent region having a wiring, positioned inside said housing,
(f) a communication port formed between said adjacent region and said power source board installation region, said wiring being disposed through said communication port, and
(g) a partition board positioned in said communication port between said adjacent region and said power source board installation region, said partition board is positioned integrally with said top plate.

16. A unit of claim 5, further comprising:
(e) an adjacent region having a wiring, positioned inside said housing,
(f) a communication port formed between said adjacent region and said power source board installation region, said wiring being positioned through said communication port, and
(g) a partition board positioned in said communication port between said adjacent region and said power source board installation region,
wherein said drip board and said partition board are positioned integrally with said top plate.

17. A unit of claim 5, further comprising:
(e) an adjacent region having a wiring, positioned inside said housing,
(f) a communication port formed between said adjacent region and said power source board installation region, said wiring being installed through said communication port, and
(g) a partition board positioned in said communication port between said adjacent region and said power source board installation region, said partition board being positioned integrally with said top plate, and
(h) a flexible member positioned at a lower end of the partition board, and
is deformed to contact tightly with said communication port.

18. A unit of claim 5, further comprising:
(e) an adjacent region having a wiring, positioned inside said housing,
(f) a communication port formed between said adjacent region and said power source board installation region, said wiring being positioned through said communication port, and
(g) a partition board positioned in said communication port between said adjacent region and said power source board installation region, and
(h) a flexible member positioned at a lower end of said partition board,
wherein said drip board and said partition board are positioned integrally with said top plate, and
said drip board is positioned between said fan and said power source board, and said flexible member is deformed to contact tightly with said communication port through said wiring.

* * * * *

UNITED STATES PATENT AND TRADE MARK OFFICE
CERTIFICATE OF CORRECTION

PATENT NO. : 6,053,004
DATED : April 25, 2000
INVENTOR(S) : Beppu et al.

It is certified that error appears in the above-identified patent and that said Letters Patent is hereby corrected as shown below:

Cover page, item [56] References Cited, FOREIGN PATENT DOCUMENTS, list:

--9-159221  6/1997  Japan
 3-100729  10/1991  Japan
 62-14237  1/1997  Japan
 60-135589  9/1985  Japan--

Cover page, item [56] References Cited, list:

--OTHER DOCUMENTS

Japanese Search Report for Int'l Appln. No. PCT/JP98/00725 dated May 12, 1998.--

Signed and Sealed this

Twenty-fourth Day of April, 2001

Attest:

NICHOLAS P. GODICI

Attesting Officer

Acting Director of the United States Patent and Trademark Office